(12) United States Patent
Ploumen et al.

(10) Patent No.: US 6,658,105 B1
(45) Date of Patent: Dec. 2, 2003

(54) METHOD TO REDUCE DISTORTION OF A DIGITAL DATA SIGNAL BY A POTS RINGING SIGNAL, AND RELATED TELEPHONE RINGING SIGNAL GENERATOR

(75) Inventors: Franciscus Maria Ploumen, Antwerp (BE); Luc Josephine Theoduul De Clercq, Waasmunster (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/500,442

(22) Filed: Feb. 9, 2000

(30) Foreign Application Priority Data

Jan. 20, 2000 (EP) .............................. 00400154

(51) Int. Cl.$^7$ ............................... H04M 5/00
(52) U.S. Cl. ................. 379/252; 379/373.01; 370/496; 375/254; 375/296
(58) Field of Search .................. 379/90.01, 93.01, 379/93.06, 100.17, 251, 252, 256, 286, 373.01; 375/254, 284, 285, 296; 370/493, 494, 495, 496, 525, 526

(56) References Cited

U.S. PATENT DOCUMENTS

| | | | |
|---|---|---|---|
| 4,192,007 A | 3/1980 | Becker | 364/721 |
| 5,025,443 A * | 6/1991 | Gupta | 370/494 |
| 5,623,543 A | 4/1997 | Cook | 379/402 |

FOREIGN PATENT DOCUMENTS

| | | | |
|---|---|---|---|
| EP | 0 740 451 A1 | 10/1996 | .......... H04M/11/06 |
| EP | 1119175 A1 * | 7/2001 | .......... H04M/19/02 |
| JP | 63 245 058 A | 10/1988 | .......... H04M/19/02 |
| WO | WO 99/29097 | 6/1999 | .......... H04M/11/06 |

OTHER PUBLICATIONS

"ASSL and VADSL Splitter Decision and Telephony Performance" by John Cook and Phil Sheppard, published in IEEE Journal of Selected Areas in Communications, col. 13, No. 9, Dec. 1995.

"Study of non-linear distortion in an ADSL-Lite environment" by Marc Van Bladel and Gerd Vandersteen, $5^{th}$ Bayona, Spain from Sep. 6–8, 1999.

* cited by examiner

*Primary Examiner*—Binh Tieu
(74) *Attorney, Agent, or Firm*—Sughrue Mion, PLLC

(57) ABSTRACT

To reduce the distortion of digital data due to on/off switching of the ringing of a Plain Old Telephone Service (POTS) signal (RINGING1, RINGING2) transmitted simultaneously with the digital data over a single line (LINE), the telephone ringing signal generator (POTS-RING GENERATOR 1, POTS RING GENERATOR 2) produces a digital data friendly ringing signal (RINGING1, RINGING2). The telephone ringing signal generator (POTS-RING GENERATOR 1, POTS RING GENERATOR 2) thereto applies a transient smoothening window (WINDOW1, WINDOW2) to a sine or cosine shaped signal (SINE1, SINE2).

11 Claims, 3 Drawing Sheets

METHOD TO REDUCE DISTORTION OF A DIGITAL DATA SIGNAL BY A POTS RINGING SIGNAL, AND RELATED TELEPHONE RINGING SIGNAL GENERATOR

BACKGROUND OF THE INVENTION

The present invention relates to a method to reduce distortion of digital data by a Plain Old Telephone Service (POTS) ringing signal and a telephone ringing generator enabling this method.

Several methods and devices to reduce distortion of digital data, e.g. transferred in accordance with the ADSL (Asymmetric Digital Subscriber Line) standard specification, by the high voltage ringing of a POTS (Plain Old Telephone Service) signal, transferred simultaneously with the digital data over a single line, are known in the art. Traditional splitters consisting of active or passive high pass and low pass filters, such as the ones described in the article 'ADSL and VADSL Splitter Design and telephony Performance' from the authors John Cook and Phil Sheppard that was published in IEEE Journal on Selected Areas in Communications, Vol. 13, No. 9, December 1995, separate telephony signals (including ringing) from ADSL signals at the central office and at the customer's premises thus minimising interference between the POTS and digital data transmission. These splitters however are bulky and expensive because high order (up to 7th order) operator dependent low and high pass filters are required therein.

In the full digital loop known for instance from the European Patent Application EP 0 740 451 entitled 'Method, Interface Modules and telephone Network for Multiplexing and Demultiplexing an Analog MTS (Message Telephone Service) signal and an ADSL (Asymmetric Digital Subscriber Line) Datastream' from applicant Alcatel Bell, mutual interference between concurrently transferred telephony signals and digital data is avoided by digitising the telephony signals and by embedding the digitised telephony signals in the digital data frames that also convey the digital data. POTS signalling such as the ringing signal and the metering pulses are replaced with digital codes, also embedded in the digital data frames. These digital codes do not distort the digital data but encoding thereof at the transmitter's side and decoding thereof at the receiver's side requires some modifications of the current xDSL implementations. Moreover, the full digital loop requires by-passing equipment to maintain telephony service even when the digital data equipment fails, which can occur for instance in case of a power supply failure at the customer's premises, and requires the presence of a ringing signal generator at the customer's premises to re-generate the high voltage ringing signal from the received codes.

A third known method to reduce interference between simultaneously transferred digital data and telephony signals, in particular ringing signals, is known as the ADSL Lite solution with microfilters. In the ADSL Lite solution, studied for instance in the presentation summary 'Study of Non-Linear Distortion in an ADSL-Lite Environment' written by the authors Marc Van Bladel and Gerd Vandersteen and presented on the 5th Bayona Workshop on Emerging Technologies in Telecommunications held in Bayona, Spain from 6 till 8 September 1999, microfilters in the line towards the phone separate the digital data from the telephony signals before these telephony signals are supplied to the phone. Such a microfilter for example is known from the press release 'Orckit Announces New Dynamic Microfilter for Use with G.Lite ADSL' from Jun. 2, 1999 that can be retrieved from the Internet via the following URL: http://www.xdsl.com/newsreleases/xDSL/3075.asp. The telephony signals however are not separated from the digital data before the digital data are supplied to the ADSL modem so that there is distortion of digital data by the ringing signal. As a consequence, the digital data service usually goes down in the ADSL Lite solution at the moment a telephone call is set up over the same twisted pair.

SUMMARY OF THE INVENTION

An object of the present invention is to provide a method and a device for reducing distortion of digital data by the POTS ringing of a telephony signal transmitted concurrently with the digital data over a single line, but which overcome the drawbacks of the above mentioned state of the art solutions, i.e. which do not require bulky splitters with 7th order filters at the central office and customer's premises, which do not require additional encoding/decoding complexity and precautions to realise a POTS life-line in case of failure of the digital data service, and which avoid that the digital data service can go down as a result of a presence of the high voltage POTS ringing signals.

According to the invention, this object is achieved by the method to reduce distortion of digital data by a Plain Old telephone Service (POTS) ringing signal defined by claim 1, and the telephone ringing signal generator defined by claim 2.

Indeed, by windowing a sine or cosine shaped signal, a digital data friendly ringing signal is generated. The influence of the on/off switching of this digital data friendly ringing signal on digital data concurrently transmitted over the same line is far below the transient distortion due to on/off switching of a traditional sine or cosine shaped ringing signal. When smoothly windowing a sine or cosine shaped signal to constitute a digital data friendly ringing signal, a slight increase of the peak-to-average ratio (PAR) of the ringing signal is an acceptable price paid for the obtained reduction in transient distortions.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

An optional characteristic feature of the telephone ringing signal generator according to the present invention is defined by claim 3.

In this way, for new operators that do not have to care about an installed base (the so called green field installation), a per-line scenario can be implemented with a universal linecard that terminates both the telephony service and the digital data service and with an intelligent switch, smoothly controlled by for example a microprocessor so that the on/off switching of the ringing signal is aligned with respectively the beginning/ending of the applied window. For this implementation of the present invention, a traditional ringing generator sourcing an analog sine or cosine shaped ringing signal can serve as input for the smoothly controlled switches on the different linecards.

An additional characteristic feature of the telephone ringing signal generator of claim 3, is defined by claim 4.

Thus, in order to avoid distorting the ringing signal heavily by the windowing applied to reduce the ringing signal transient distortion on digital data, the window length may be selected to be equal to the on-period of the ringing signal.

Alternatively to the telephone ringing signal generator described by claim 3, an optional characteristic feature of the telephone ringing signal generator according to the present invention is defined by claim 5.

In this way, for incumbent operators that offer digital data services on top of telephony services and that want to reuse to a maximum their installed infrastructure, a scenario can be implemented whereby only the ringing card is updated to a ringing card that generates the windowed digital data friendly ringing signal, and whereby all POTS linecards and switches for on/off switching the ringing signal on the different lines are reused.

An additional characteristic feature of the telephone ringing signal generator of claim 5, is defined by claim 6.

Thus, the reused switches for on/off switching the ringing signal are controlled, for instance by a microprocessor that communicates with the ringing card generating the windowed digital data friendly ringing signal, to switch on/off respectively aligned with the beginning/ending border of the applied smooth window. The transient distortion of digital data due to on/off switching of the ringing signal is minimized this way.

Another additional characteristic feature of the telephone ringing signal generator of claim 5, is defined by claim 7.

Indeed, the window size has an impact on the reduction of transient distortion of digital data by the ringing signal. In general, a longer window size results in better transient distortion reduction. In practice, the maximum window size is limited due to the ringing cadence to the length of the on-period of the ringing signal. One on-period of the ringing signal may however comprise more than one window. An implementation wherein the window is applied more than once per on-period of the ringing signal (the window may for example have the length of 2 sine or cosine periods) may comply with existing timing specifications for switching off the ringer after ring trip detection even if the system is designed to delay on/off hook transitions until the next border of the window in order to reduce disturbance of the digital data transmission due to switching off the ringer after ring trip detection. This is not realizable with a window having the length of the full on-period of the ringing signal, because the existing delay specifications for POTS do not allow to postpone off hook until the end of the on-period of the ringing signal. The ringing signal itself however is more distorted when applying a shorter window repetitively during the on-period of the ringing signal.

A particular implementation of the telephone ringing signal generator of claim 7, is defined by claim 8.

In this way, by repetitively applying a smooth window having a length of only one sine or cosine period, the transient distortion of simultaneously transferred data due to on/off switching of the ringing signal is optimally suppressed. As already indicated in the one but previous paragraph, this optimal transient effect reduction is obtained at the price of a higher distortion (deviation from the traditional sine or cosine shaped ringing signal) of the ringing signal itself.

Furthermore, an advantageous characteristic feature of the telephone ringing signal generator according to the present invention, is defined by claim 9.

Indeed, starting windowing in a zero transition of the sine or cosine shaped signal reduces transients by up to 50 dB at the low frequency edge of the digital data band (on the lowest tones of a Discrete Multi Tone signal if DMT is used as modulation technique for the digital data). In order to minimize distortions the slope of the ringing signal must be smooth. Therefore, the window has to start and end smoothly. Because the peak-to-average ratio (PAR) of the ringing signal should not increase too much, there is also an upper bound for the smoothness or length of the rising and falling edge of the window. Taking into account that the ringing signal starts at a zero transition, the just described trade-off is met if the rising edge of the window starts at zero phase and ends between $\pi/2$ and $\pi$ phase of the sine or cosine shaped signal. In general it is concluded that optimum transient effect suppression is obtained with a flat starting and ending window, whereby the window size is large enough in order to keep the slope of the ringing signal within reasonable boundaries.

Particular examples of the telephone ringing signal generator of claim 9, are defined by claims 10 and 11 respectively.

Indeed, a Hanning window as well as a polynomial window are smooth windows that start at zero amplitude and whose rising edge can be shaped to start at zero phase of the sine or cosine shaped signal and ends in between $\pi/2$ and $\pi$ phase of this sine or cosine shaped signal.

BRIEF DESCRIPTION OF THE DRAWINGS

The above mentioned and other objects and features of the invention will become more apparent and the invention itself will be best understood by referring to the following description of an embodiment taken in conjunction with the accompanying drawings, wherein.

DETAILED DESCRIPTION OF THE INVENTION

Figure 1:
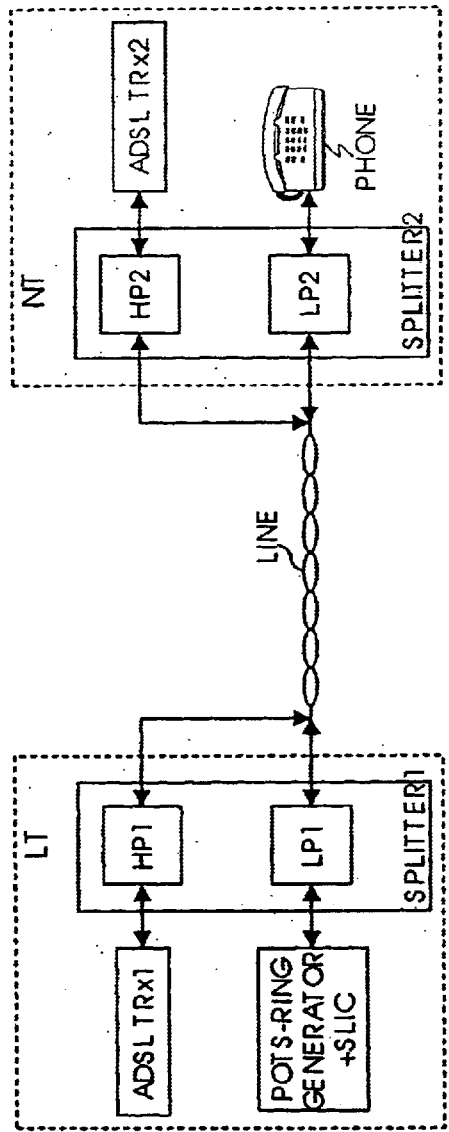
FIG. 1 is a block scheme of a communication system including a network termination NT and a line termination LT comprising a POTS and ringing generator POTS-RING GENERATOR+SLIC wherein the present invention is applied.

FIG. 1 shows a communication system with at the central office side a line termination LT and at the customer premises side a network termination NT. In between the line termination LT and the network termination NT, there is a twisted pair telephone line LINE. The line termination LT includes an ADSL (Analog Digital Subscriber Line) transceiver ADSL TRx1, a POTS and ringing generator POTS-RING GENERATOR+SLIC, and a splitter SPLITTER1 having a low pass filter LP1 and high pass filter HP1. The ADSL transceiver ADSL TRx1 is coupled to the telephone line LINE via the high pass filter HP1 in the splitter SPLITTER1 whereas the POTS and ringing generator POTS-RING GENERATOR+SLIC is coupled to the telephone line LINE via the low pass filter LP1 in the splitter SPLITTER1. The network termination NT includes a second ADSL transceiver ADSL TRx2, a telephone terminal PHONE and a second splitter SPLITTER2 having a low pass filter LP2 and a high pass filter HP2. The second ADSL transceiver ADSL TRx2 is coupled via the high pass filter HP2 of the second splitter SPLITTER2 to the telephone line LINE, whereas the telephone terminal PHONE is coupled via the low pass filter LP2 in the second splitter SPLITTER2 to the telephone line LINE.

Over the telephone line LINE, the line termination LT and the network termination concurrently transmit narrowband telephone signals and broadband digital data in a frequency division multiplexed way. The telephone signals occupy a low frequency band up to 3.4 kHz, whereas the digital data are transferred in the a frequency band in accordance with the ADSL (Asymmetric Digital Subscriber Line) standard specification. The telephone signals are filtered from the digital data by the low pass filters LP1 and LP2, thus enabling the POTS and ringing generator POTS-RING GENERATOR+SLIC and the telephone terminal PHONE to communicate without disturbance from the digital data. The digital data are filtered from the telephone signals by the high pass filters HP1 and HP2, thus enabling the two ADSL transceivers ADSL TRx1 and ADSL TRx2 to communicate without disturbance from the telephone signals. To minimise distortion of the digital data by the high voltage ringing signal, put on the line by the POTS and ringing generator POTS-RING GENERATOR+SLIC to announce incoming telephone calls to the telephone terminal PHONE, the POTS and ringing generator POTS-RING GENERATOR+SLIC generates a digital data friendly ringing signal. How this is done will be explained in the following paragraphs that concentrate on the working of the POTS and ringing generator POTS-RING GENERATOR+SLIC of FIG. 1.

Figure 2:
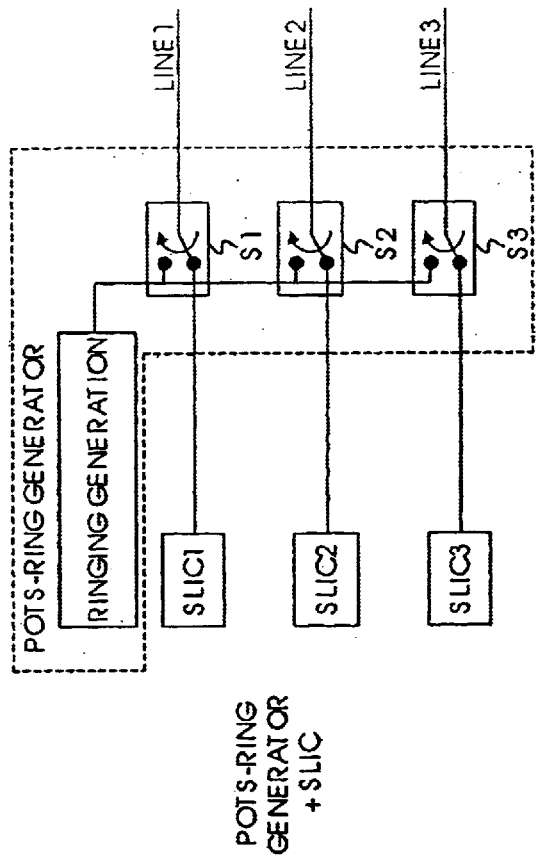
FIG. 2 is a more detailed block scheme of the POTS and ringing generator POTS-RING GENERATOR+SLIC of FIG. 1 comprising a telephone ringing signal generator according to the present invention POTS-RING GENERATOR.

As can be seen from FIG. 2, the POTS and ringing generator POTS-RING GENERATOR+SLIC of FIG. 1 comprises a telephone ringing signal generator POTSRING GENERATOR and a number of subscriber line integrated circuits SLIC1, SLIC2 and SLIC3. These subscriber line integrated circuits SLIC1, SLIC2 and SLIC3 are coupled to respective telephone lines LINE1, LINE2 and LINE3, via respective switching elements S1, S2 and S3 that form part of the telephone ringing signal generator POTS-RING GENERATOR (It is to be noticed that the ringing generator POTS-RING GENERATOR of FIG. 2 is only a functional block grouping all ringing signal generating and ringing cadence producing functionality. Physically, the switching elements S1, S2 and S3 may be located on respective POTS linecards whereon also the subscriber line integrated circuits SLIC1, SLIC2 and SLIC3 are located, or the switching elements Si, S2 and S3 alternatively may be integrated in the subscriber line integrated circuits SLIC1, SLIC2 and SLIC3). The first telephone line LINE1 for instance may correspond to the twisted pair telephone line LINE of FIG. 1. The telephone ringing signal generator POTS-RING GENERATOR further contains a ringing signal generation device RINGING GENERATION whose output is coupled to second inputs of the switching elements S1, S2 and S3.

In the situation drawn in FIG. 2, all subscriber line integrated circuits SLIC1, SLIC2 and SLIC3 are connected to the respective telephone lines LINE1, LINE2, and LINE3 via which they communicate with telephone terminals. The ringing signal generation device RINGING GENERATION continuously produces a ringing signal at its output. When an incoming telephone call for the first line LINE1 has to be announced, the first switch S1 will connect the output of the ringing signal generation device RINGING GENERATION instead of the output of the first subscriber line integrated circuit SLIC1 to the first line LINE1. As will be explained, referring to FIG. 3 and FIG. 4, the ringing signal produced by the ringing signal generation device RINGING GENERATION may already be the above mentioned digital data friendly ringing signal. The switching elements S1, S2 and S3 then are switches with only two states: either they connect a subscriber line integrated circuit to the telephone line or they connect the ringing signal generation device to the telephone line. The switches S1, S2 and S3 are controlled to switch between these two states at moments chosen so as to minimally distort the digital data on the line. Alternatively, as will be explained referring to FIG. 5 and FIG. 6, the ringing signal generated by the ringing signal generation device RINGING GENERATION may be a sine or cosine shaped signal that is made digital data friendly by the switching elements S1, S2 and S3. In that case, the switching elements S1, S2 and S3 need to be intelligent switches smoothly controlled to switch between the state wherein a subscriber line integrated circuit is connected to a telephone line and a state wherein the ringing signal generation device RINGING GENERATION is connected to the telephone line.

Figure 3:
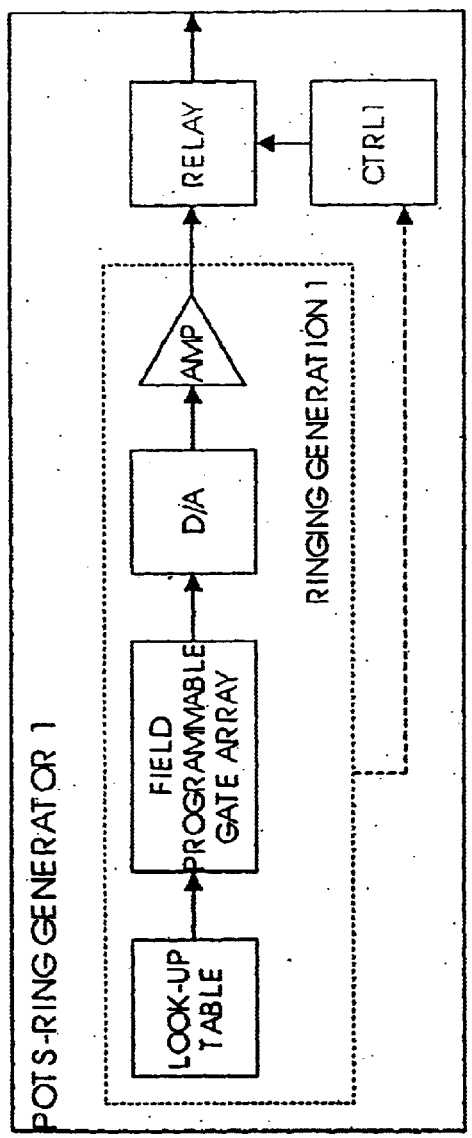
FIG. 3 is a block scheme of a first embodiment of the telephone ringing signal generator POTS-RING GENERATOR 1 according to the present invention.

In a first scenario, it is supposed that already existing equipment from an incumbent telephone operator, such as the switches S1, S2 and S3, has to be reused as much as possible. The ringing signal generation device RINGING GENERATION and the first switching element S1 of FIG. 2 are then implemented by the ringing signal generation device POTS-RING GENERATION 1 and the relay RELAY of the telephone ringing signal generator POTS-RING GENERATOR 1 drawn in FIG. 3. The ringing signal generation device RINGING GENERATION 1 consists of a look-up table LOOK-UP TABLE, a field programmable gate array FIELD PROGRAMMABLE GATE ARRAY, a digital to analog converter D/A and an amplifier AMP that are cascade coupled. An amplified output of the digital to analog converter D/A thus serves as an input for the relay RELAY, whose output is further coupled to a telephone line, not drawn in FIG. 3. Also not drawn in FIG. 3 is the subscriber line integrated circuit whose output is coupled to a second input of the relay RELAY. The ringing signal generation device RINGING GENERATION further is coupled to a control device CTRL1 that has an output interconnected with a control input of the relay RELAY.

Figure 4:
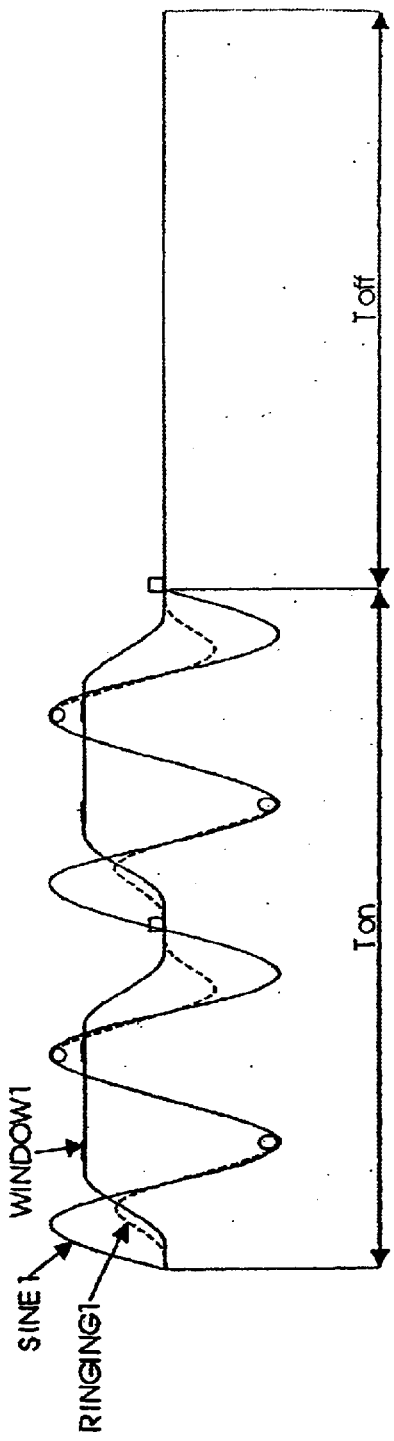
FIG. 4 is a graph illustrating the shape of the ringing signal RINGING1 produced by the telephone ringing signal generator POTS-RING GENERATOR 1 shown in FIG. 3.

The look-up table LOOK-UP TABLE memorises samples of a smoothly windowed ringing signal RINGING1, that is drawn in FIG. 4. This smoothly windowed ringing signal RINGING1 is obtained by windowing a sine shaped signal SINE1 with a Hanning window WINDOW1 having the length of two periods of the sine shaped signal SINE1. The start of rising edge of the Hanning window WINDOW1 is aligned with the zero transition of the sine shaped signal SINE1, and the rising edge ends at about a phase $\pi$ of the first period of the sine shaped signal SINE1. This Hanning window WINDOW1 is repetitively applied to each two periods of the sine shaped signal SINE1, resulting in the dotted digital data friendly ringing signal RINGING1, digital samples of which are thus stored in the look-up table LOOK-UP TABLE of FIG. 3. The field programmable gate array FIELD PROGRAMMABLE GATE ARRAY, the digital to analog converter D/A and the amplifier AMP read out the samples memorised in the look-up table, constitute from these samples, e.g. by interpolation, an analog signal, and amplify this analog signal (typically a 1 Volt peak-to-peak analog signal is amplified up to an 60 Volt peak ringing signal) to produce the ringing signal RINGING1. This ringing signal RINGING1 is put on the telephone line to announce an incoming call by the relay RELAY, that implements the ringing cadence: the ringing signal RINGING1 is only supplied to the telephone line during time periods Ton wherein the ringing is on, and not during time periods Toff wherein the ringing is off. To reduce transient distortion of digital data simultaneously transferred over the line, the control device CTRL1, that may be implemented by a microprocessor, controls the relay RELAY so that the borders of the time periods Ton and Toff are aligned with borders of the repetitively applied Hanning window WINDOWS. The control device CTRL thereto receives instructions from the ringing signal generation device RINGING GENERATION 1.

It is remarked that a complete telephone ringing signal generator such as POTS-RING GENERATOR 1 drawn in FIG. 3 not necessarily should constitute a separate device but may alternatively be integrated into a newly developed POTS subscriber line integrated circuit SLIC that has the capability to produce a windowed ringing signal.

Figure 5:
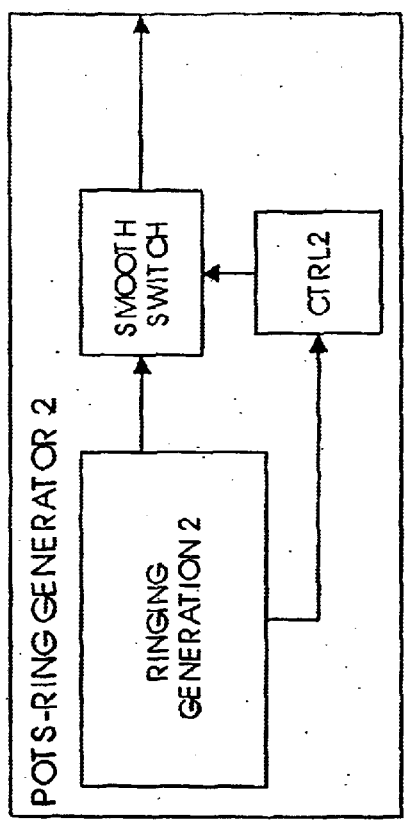
FIG. 5 is a block scheme of a second embodiment of the telephone ringing signal generator POTS-RING GENERATOR 2 according to the present invention.
Figure 6:
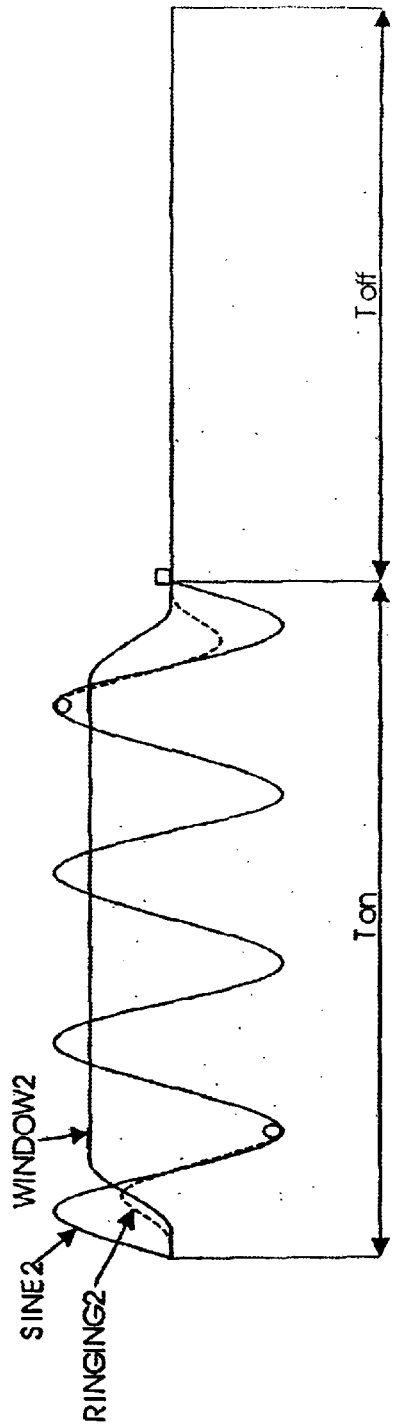
FIG. 6 is a graph illustrating the shape of the ringing signal RINGING2 produced by the telephone ringing signal generator POTS-RING GENERATOR 2 shown in FIG. 5.

In a second scenario, illustrated by FIG. 5 and FIG. 6, a greenfield installation for a new operator is considered. The ringing signal generation device RINGING GENERATION and the first switching element S1 of FIG. 2 are then implemented by the ringing signal generation device POTS-RING GENERATION 2 and the intelligent switch SMOOTH SWITCH of the telephone ringing signal generator POTS-RING GENERATOR 2 drawn in FIG. 5. The ringing signal generation device RINGING GENERATION 2 is coupled with an output to a first input of the intelligent switch SMOOTH SWITCH. To a second input of the intelligent switch, a subscriber line integrated circuit, not drawn in FIG. 5 is connected. The output of the intelligent switch SMOOTH SWITCH is coupled to a telephone line, also not drawn in FIG. 5.

Furthermore, a control device CTRL2 whose input is coupled to an output of the ringing signal generation device RINGING GENERATION, is connected to a control input of the intelligent switch SMOOTH SWITCH.

The ringing signal generation device RINGING GENERATION 2 of FIG. 5 produces at its output the analog sine shaped signal SINE2 drawn in FIG. 6. When an incoming call has to be announced and the intelligent switch SMOOTH SWITCH disconnects the subscriber line integrated circuit from the telephone line, the ringing signal generation device RINGING GENERATION 2 furthermore instructs the control device CTRL2 to make the intelligent switch SMOOTH SWITCH smoothly switch from the ringing-on period Ton to the ringing-off period Toff and vice versa to thereby realise the ringing cadence. This smooth switching follows the behaviour of the Hanning window WINDOW2 drawn in FIG. 6. This Hanning window WINDOW2 has a length equal to the ringing-on period Ton and a rising edge that starts at zero transition of the sine shaped signal SINE2 and ends at approximately π phase of the first period of this sine shaped signal SINE2. In this way, a digital data friendly ringing signal RINGING2, illustrated by the dotted line in FIG. 6, is produced at the output of the intelligent switch SMOOTH SWITCH. The distortion of digital data on the telephone line by the transient behaviour due to on/off switching the ringing signal RINGING2 is far below the distortion that digital data would suffer from in case the sine shaped ringing signal SINE2 at the output of the ringing signal generation device RINGING GENERATION 2 would be put on the line during the ringing-on periods Ton.

It is to be remarked that the present invention is suitable for application on any line whereon digital data and analog telephone signals are concurrently transmitted. Although the data in the above described embodiment are transferred in accordance with the ADSL standard specification, a skilled person will appreciate that applicability of the present invention is not restricted to a any particular kind of physical layer transfer protocol (ADSL, VDSL, SDSL, HDSL, . . . ) for the digital data. It is also to be noticed that, although the digital data and telephone signals in the above described communication system are transported over a twisted pair telephone line LINE, the applicability of the present invention is not restricted by the transmission medium via which the data and telephone signals are transported. In particular on a cable connection, an optical connection, a satellite connection, a radio link through the air, and so on, the present invention may be realised.

Furthermore, it is remarked that an embodiment of the present invention is described above rather in terms of functional blocks. From the functional description of these blocks it will be obvious for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention.

What is claimed is:

1. Method to reduce distortion of digital data by a Plain Old Telephone Service (POTS) ringing signal (RINGING1, RINGING2) sent simultaneously with said digital data over a communication line (LINE), CHARACTERISED IN THAT said method includes producing said ringing signal (RINGING1, RINGING2) by applying a transient smoothening window (WINDOW1, WINDOW2) to a sine or cosine shaped signal (SINE1, SINE2).

2. Telephone ringing signal generator (POTS-RING GENERATOR 1, POTS RING GENERATOR 2) for generating a Plain Old Telephone Service (POTS) ringing signal (RINGING1, RINGING2) to be sent simultaneously with digital data over a communication line (LINE), CHARACTERISED IN THAT said telephone ringing signal generator (POTSRING GENERATOR 1, POTS RING GENERATOR 2) comprises windowing means (LOOK-UP TABLE, SMOOTH SWITCH) adapted to apply a transient smoothening window (WINDOW1, WINDOW2) to a sine or cosine shaped signal (SINE1, SINE2) to thereby produce said ringing signal (RINGING1, RINGING2).

3. Telephone ringing signal generator (POTS-RING GENERATOR 1, POTS RING GENERATOR 2) according to claim 2, CHARACTERISED IN THAT said windowing means comprises a smoothly controllable switch (SMOOTH SWITCH) whereto an analogue version of said sine or cosine shaped signal (SINE2) is supplied.

4. Telephone ringing signal generator (POTS-RING GENERATOR 1, POTS RING GENERATOR 2) according to claim 3, CHARACTERISED IN THAT said window (WINDOW2) has a length equal to a time interval (Ton) during which ringing is on.

5. Telephone ringing signal generator (POTS-RING GENERATOR 1, POTS RING GENERATOR 2) according to claim 2, CHARACTERISED IN THAT said windowing means comprises a lookup table (LOOK-UP TABLE) adapted to memorise samples of a windowed sine or cosine shaped signal, a digital to analogue converter (D/A) to generate said ringing signal (RINGING1) from said samples, and a switch (RELAY) to repetitively couple an output of said digital to analogue converter (D/A) to said communication line (LINE) during a first time interval (Ton) during which ringing is on and to de-couple said output of said digital to analogue converter (D/A) from said communication line (LINE) during a second time interval (Toff) during which ringing is off.

6. Telephone ringing signal generator (POTS-RING GENERATOR 1, POTS RING GENERATOR 2) according to claim 5, CHARACTERISED IN THAT said windowing means further comprises a switch controller (CTRL1) adapted to control said switch (RELAY) to switch on or off respectively at a beginning or at an end of said window (WINDOW1).

7. Telephone ringing signal generator (POTS-RING GENERATOR 1, POTS RING GENERATOR 2) according to claim 5, CHARACTERISED IN THAT said window (WINDOW1) has a length equal to an integer number of periods of said sine or cosine shaped signal (SINE1), said window (WINDOW1) being repetitively applied during a time interval (Ton) during which ringing is on.

8. Telephone ringing signal generator (POTS-RING GENERATOR 1, POTS RING GENERATOR 2) according to claim 7, CHARACTERISED IN THAT said window has a length of one period of said sine or cosine shaped signal (SINE1).

9. Telephone ringing signal generator (POTS-RING GENERATOR 1, POTS RING GENERATOR 2) according to claim 1, CHARACTERIZED IN THAT a rising edge of said window (WINDOW1, WINDOW2) starts at zero transition of said sine or cosine shaped signal (SINE1, SINE2) with a zero amplitude and ends between $\pi/2$ and $\pi$ phase of a first period of said sine or cosine shaped signal (SINE1, SINE2) with a one amplitude.

10. Telephone ringing signal generator (POTS-RING GENERATOR 1, POTS RING GENERATOR 2) according to claim 9, CHARACTERISED IN THAT said window is a Hanning window.

11. Telephone ringing signal generator (POTS-RING GENERATOR 1, POTS RING GENERATOR 2) according to claim 9, CHARACTERISED IN THAT said window is a polynomial window.

* * * * *